(12) United States Patent
Choi et al.

(10) Patent No.: US 9,886,616 B2
(45) Date of Patent: Feb. 6, 2018

(54) METHOD AND APPARATUS FOR FINGERPRINT RECOGNITION AND AUTHENTICATION

(71) Applicant: CRUCIALTEC CO., LTD., Chungcheongnam-do (KR)

(72) Inventors: Jae Joon Choi, Gyeonggi-do (KR); Baek Bum Pyun, Seoul (KR); Sung Chan Park, Seoul (KR)

(73) Assignee: Crucialtec Co., Ltd., Seongnam-si (KR)

( * ) Notice: Subject to any disclaimer, the term of this patent is extended or adjusted under 35 U.S.C. 154(b) by 64 days.

(21) Appl. No.: 14/900,498

(22) PCT Filed: May 27, 2014

(86) PCT No.: PCT/KR2014/004696
§ 371 (c)(1),
(2) Date: Dec. 21, 2015

(87) PCT Pub. No.: WO2014/204110
PCT Pub. Date: Dec. 24, 2014

(65) Prior Publication Data
US 2017/0017825 A1    Jan. 19, 2017

(30) Foreign Application Priority Data

Jun. 19, 2013    (KR) .......................... 10-2013-0070518

(51) Int. Cl.
*G06K 9/00* (2006.01)
*G06K 9/40* (2006.01)
*G06K 9/52* (2006.01)

(52) U.S. Cl.
CPC ..... *G06K 9/00026* (2013.01); *G06K 9/00087* (2013.01); *G06K 9/40* (2013.01); *G06K 9/52* (2013.01)

(58) Field of Classification Search
CPC combination set(s) only.
See application file for complete search history.

(56) References Cited

U.S. PATENT DOCUMENTS

| 5,644,645 A * | 7/1997 | Osuga ....................... G06T 9/00 |
|---|---|---|
| | | 358/435 |
| 6,876,757 B2 * | 4/2005 | Yau .................... G06K 9/00067 |
| | | 340/5.83 |

(Continued)

FOREIGN PATENT DOCUMENTS

| JP | 07057099 A | 3/1995 |
|---|---|---|
| KR | 1020050010102 A | 1/2005 |

(Continued)

*Primary Examiner* — Anand Bhatnagar
(74) *Attorney, Agent, or Firm* — H.C. Park & Associates, PLC

(57) ABSTRACT

According to one embodiment of the present invention, provided is a method for fingerprint recognition and authentication, comprising: a step for sequentially acquiring a plurality of slice images including a fingerprint pattern via a fingerprint sensor; a slice dividing unit for dividing the slice images into block images; a step for converting spatial domain information of the block images into frequency domain information, and eliminating information of a high-frequency component by using a low-pass filter; and a step for forming a fingerprint pattern template by matching the block images, from which the information of the high-frequency component has been eliminated.

8 Claims, 5 Drawing Sheets

(56) References Cited

U.S. PATENT DOCUMENTS

| | | | | |
|---|---|---|---|---|
| 7,489,391 | B2* | 2/2009 | Engheta | A61B 5/1172 |
| | | | | 356/71 |
| 8,233,675 | B2* | 7/2012 | Reed | G06K 9/00885 |
| | | | | 382/118 |
| 8,655,026 | B2* | 2/2014 | Akkermans | G06K 9/00067 |
| | | | | 235/380 |
| 8,886,953 | B1* | 11/2014 | Sipe | G06F 21/32 |
| | | | | 713/186 |
| 2003/0039382 | A1* | 2/2003 | Yau | G06K 9/00067 |
| | | | | 382/125 |
| 2004/0042645 | A1* | 3/2004 | Wang | G06K 9/00067 |
| | | | | 382/125 |
| 2005/0157913 | A1* | 7/2005 | Yau | G06K 9/00067 |
| | | | | 382/125 |
| 2007/0092114 | A1* | 4/2007 | Ritter | G06F 21/32 |
| | | | | 382/115 |
| 2008/0226124 | A1* | 9/2008 | Seo | H04N 1/3217 |
| | | | | 382/100 |
| 2012/0321125 | A1* | 12/2012 | Choi | G06K 9/6206 |
| | | | | 382/100 |

FOREIGN PATENT DOCUMENTS

| | | |
|---|---|---|
| KR | 1020110107657 A | 10/2011 |
| KR | 1020120138282 A | 12/2012 |

* cited by examiner

[Fig. 1]
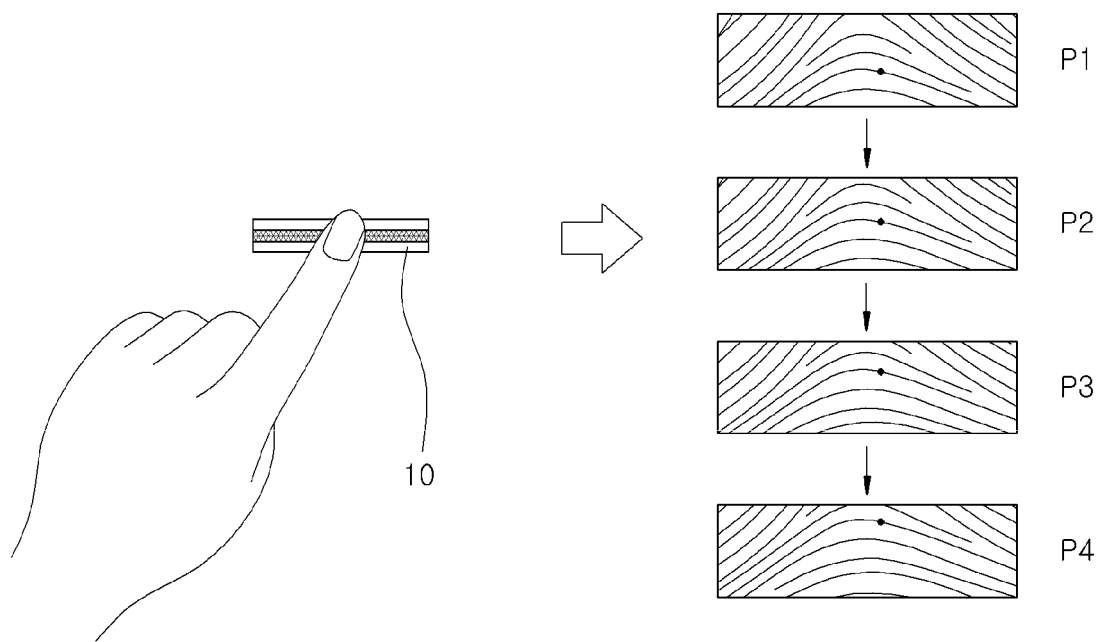
[Fig. 2]
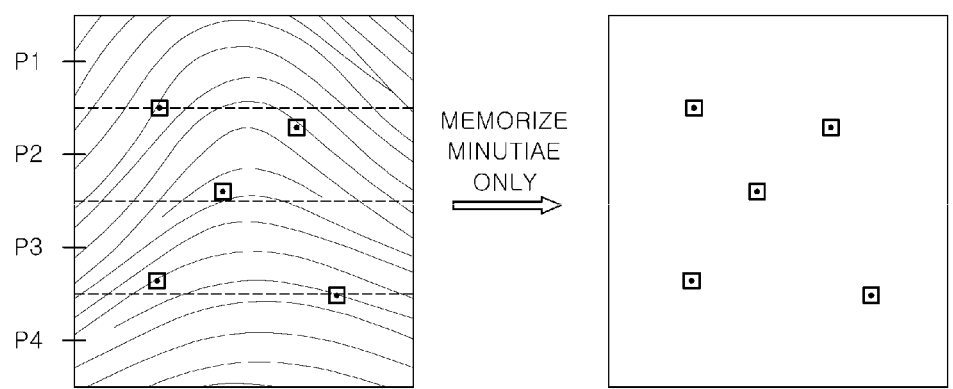

[Fig. 3]
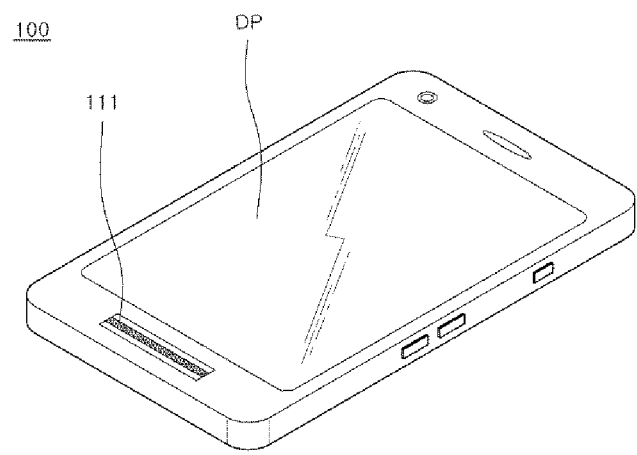

[Fig. 4]
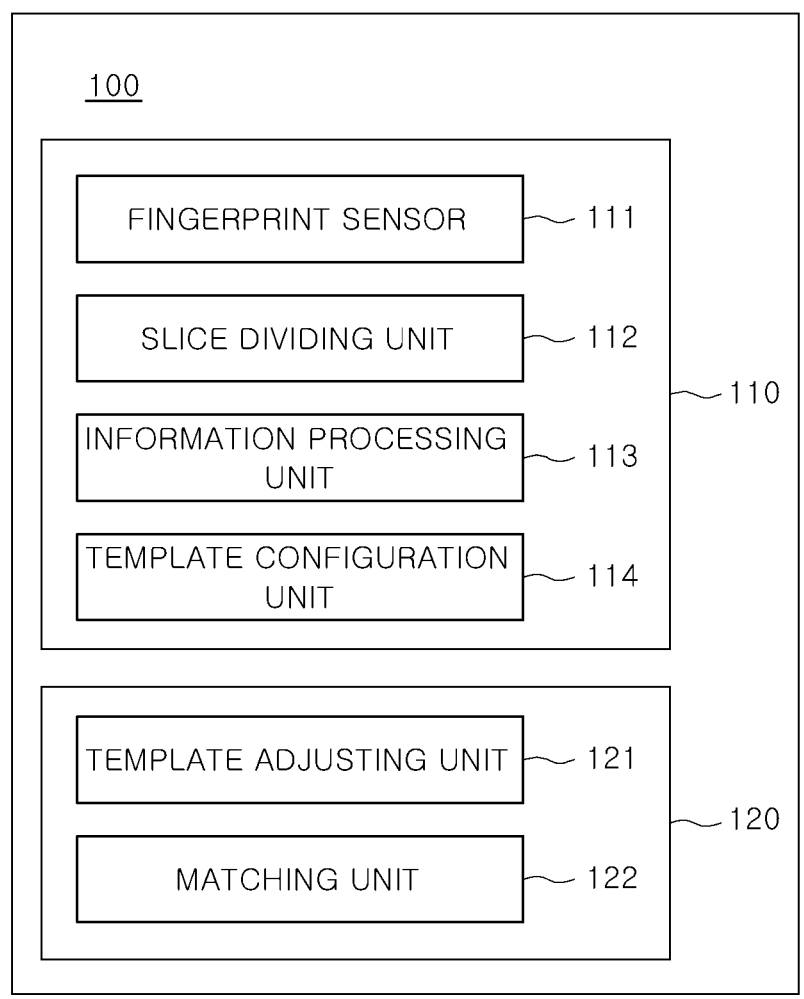

[Fig. 5]
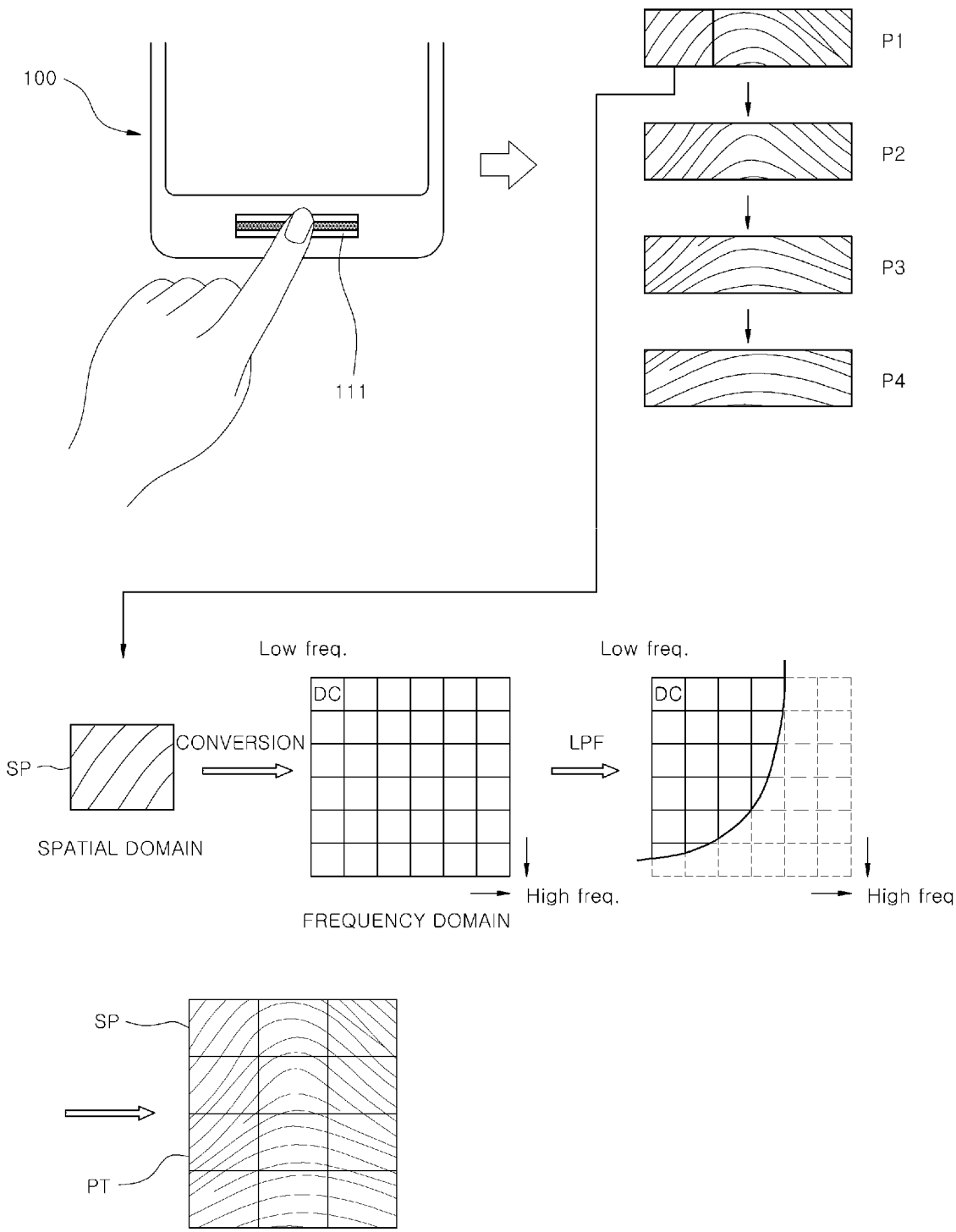

[Fig. 6]
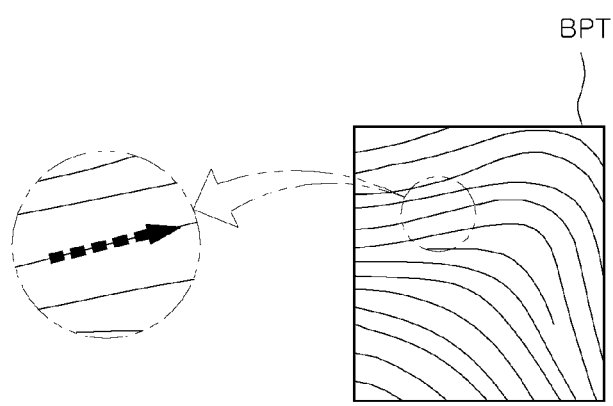
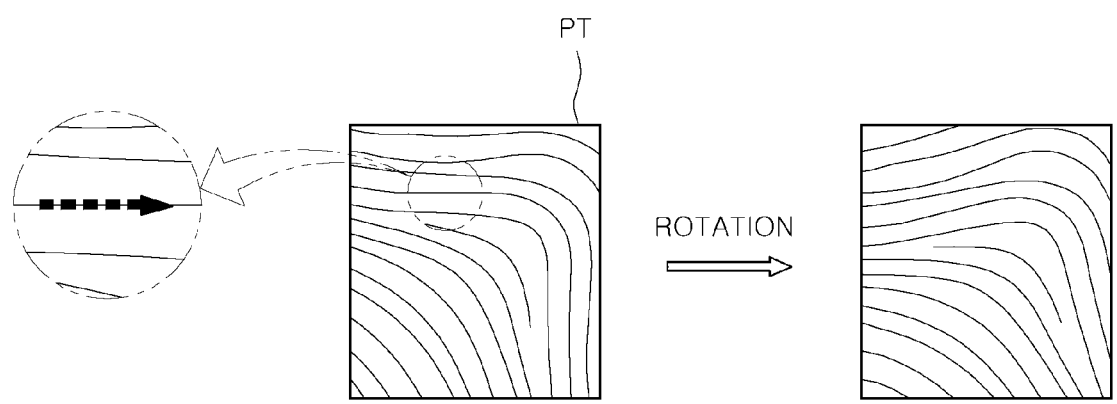

METHOD AND APPARATUS FOR FINGERPRINT RECOGNITION AND AUTHENTICATION

CROSS-REFERENCE TO RELATED APPLICATIONS

This application is the U.S. national stage application of International Patent Application No. PCT/KR2014/004696, filed May 27, 2014, which claims priority to Korean Application No. 10-2013-0070518, filed Jun. 19, 2013, the disclosures of each of which are incorporated herein by reference in their entirety.

TECHNICAL FIELD

The present invention relates to a method and apparatus for fingerprint recognition and authentication, more specifically to a method and apparatus for improving accuracy in fingerprint recognition and authentication.

BACKGROUND ART

Recently, a mobile communication terminal provides communication functions such as telephone or text message transmission services as well as various additional functions utilizing personal information such as mobile banking, etc. Accordingly, the necessity of locking devices of the mobile communication terminal is considered more important.

Most existing locking devices applied to the mobile communication terminal used a conventional method of using a password. For example, the conventional method was to apply a locking device to the telephone function, additional function, or international telephone function, etc., and to input the corresponding password in order to use the corresponding function.

However, this method caused inconveniences that it became useless when the password is revealed, the password should be periodically changed to secure stability, a user should memorize the password, etc.

Thus, recently, in order to supplement this method and improve locking effect, terminals with locking devices using fingerprint recognition have been developed in earnest.

In order to mount this fingerprint recognition device on mobile communication terminals which are manufactured compactly, the size of its sensor should be minimized. Accordingly, a fingerprint recognition sensor with 'a sliding method' which recognizes a fingerprint by swiping a finger on a bar-shaped sensor which is long from side to side has been developed.

FIGS. 1 and 2 are views illustrating an operation of a fingerprint recognition sensor with a conventional sliding method.

Referring to FIGS. 1 and 2, when a user touches a fingerprint sensor 10 with his finger and moves his finger with the sliding method, partial short images P1~P4 are acquired continuously.

A fingerprint includes various minutiae. Specifically, the fingerprint includes an ending where a ridge is cut off, bifurcation where two ridges are met, etc. The minutiae vary depending on people, so the minutiae derived from short images P1~P4 also vary depending on people.

As illustrated in FIG. 2, the conventional method of fingerprint recognition utilizes a method of selecting minutiae from short images P1~P4, matching minutiae derived from each short image P1~P4 to make one minutiae template, establishing database for the position and number of minutiae, and performing comparison and analysis.

The fingerprint database is made by fingerprint registration by a specific user, and a method for registering a fingerprint is performed in the same manner as the method for fingerprint recognition.

This conventional method for fingerprint registration and fingerprint recognition utilizes a method of matching minutiae of the fingerprint, so matching information needs to be simple, thereby resulting in errors in fingerprint recognition. Additionally, when the registered fingerprint does not match with the recognized fingerprint in terms of direction, etc., there is a problem that the fingerprint will not be matched. Also, the fingerprint is sensed in a small-sized bar-shaped sensor 10, so an entire image of the fingerprint cannot be acquired, and accordingly, there is no doubt that recognition accuracy decreases when only part of the fingerprint image is inputted.

DISCLOSURE

Technical Problem

It is a purpose of the present invention to solve the above-mentioned problem of conventional art. It is another purpose of the present invention is provide a method for fingerprint recognition, which improves accuracy in fingerprint recognition, and is not affected by rotation and distortion during fingerprint recognition.

Technical Solution

In order to achieve the above purpose, according to an embodiment of the present invention, a method for fingerprint recognition and authentication is provided, which includes the steps of sequentially acquiring a plurality of slice images including a fingerprint pattern via a fingerprint sensor, a slice dividing unit dividing the slice images into block images, converting spatial domain information of the block images into frequency domain information, and eliminating information of a high-frequency component by using a low-pass filter, and forming a fingerprint pattern template by matching the block images, from which the information of the high-frequency component has been eliminated.

The method for fingerprint recognition and authentication may further include matching a ridge flow direction at the fingerprint pattern template with a ridge flow direction at a pre-registered basic fingerprint pattern template, and comparing the fingerprint pattern template with the basic fingerprint pattern template to perform authentication.

The step of matching the ridge flow directions may include the step of rotating the fingerprint pattern template by an angle unmatched when the ridge flow directions are not matching at corresponding points between the templates.

The method for fingerprint and authentication may further include the step of performing a hashing for the block images from which the information of the high-frequency component has been eliminated.

Meanwhile, according to another embodiment of the present invention, an apparatus for fingerprint recognition and authentication is provided, which includes a fingerprint sensor sequentially acquiring a plurality of slice images from a fingerprint which slides on a surface, a slice dividing unit dividing the slice images into block images; an information processing unit converting spatial domain information of the block images into frequency domain information, and eliminating information of a high-frequency component by using a low-pass filter, and a template configuration unit forming a fingerprint pattern template by matching the block images, from which the information of the high-frequency component has been eliminated.

The apparatus for fingerprint recognition and authentication may further include a template adjusting unit matching a ridge flow direction at the fingerprint pattern template with a ridge flow direction at a pre-registered basic fingerprint pattern template, and a matching unit comparing the fingerprint pattern template with the basic fingerprint pattern template to perform authentication.

The template adjusting unit may rotate the fingerprint pattern template by an angle unmatched when the ridge flow directions are not matching at corresponding points between the templates.

The information processing unit may further perform a hashing for the block images, from which the information of the high-frequency component has been eliminated.

Advantageous Effects

According to the present invention, the fingerprint recognition is made based on the fingerprint pattern itself, not on minutiae of the fingerprint. Thus, matching information may increase, thereby increasing accuracy in fingerprint recognition.

Additionally, according to the present invention, the matching process is performed by adjusting the recognized fingerprint based on the ridge flow direction of the fingerprint. Thus, fingerprint recognition will not be much affected by rotation and distortion.

DESCRIPTION OF DRAWINGS

FIGS. 1 and 2 are views illustrating an operation of a fingerprint recognition sensor with a conventional sliding method;

FIG. 3 is a view illustrating a structure of the apparatus for fingerprint recognition and authentication according to an embodiment of the present invention;

FIG. 4 is a block diagram illustrating the detailed constitution of apparatus for fingerprint recognition and authentication according to an embodiment of the present invention;

FIG. 5 is a view illustrating a method for fingerprint recognition according to an embodiment of the present invention; and FIG. 6 is a view illustrating a method for fingerprint authentication according to an embodiment of the present invention.

MODES OF THE INVENTION

Hereinafter, the terms used in the specification will be briefly described, and then the present invention will be described in detail.

The terms used in the present invention are those general terms currently widely used in the art in consideration of functions in regard to the present invention, but the terms may vary according to the intention of those of ordinary skill in the art, precedents, or new technology in the art. Also, specified terms may be selected by the applicant, and in this case, the detailed meaning thereof will be described in the detailed description of the invention. Thus, the terms used in the specification should be understood not as simple names but based on the meaning of the terms and the overall description of the invention.

Throughout the specification, it will also be understood that when a component "includes" an element, unless there is another opposite description thereto, it should be understood that the component does not exclude another element but may further include another element. In addition, terms such as " . . . unit," " . . . module," or the like refers to units that perform at least one function or operation, and the units may be implemented as hardware or software or as combination of hardware and software. Further, it will be understood that when an element is referred to as being "connected to" another element, it may be "directly connected to" the other element, or intervening elements or layers may be present.

Hereinafter, examples of the present invention will be explained with reference to the accompanying drawings to an extent to be easily carried out by a person having ordinary skill in the art. The present invention, however, may be modified in various different ways, and should not be construed as limited to the embodiments set forth herein. Also, in order to clearly explain the present disclosure, portions that are not related to the present disclosure are omitted, and like reference numerals are used to refer to like elements throughout.

Hereinafter, examples of the present invention will be explained in detail with reference to the accompanying drawings.

FIG. 3 is a view illustrating a structure of the apparatus for fingerprint recognition and authentication according to an embodiment of the present invention.

Referring to FIG. 3, the apparatus 100 for fingerprint recognition and authentication may include a fingerprint sensor 111 on at least a part thereof. In the drawings, it is illustrated that the fingerprint sensor 111 is formed on an edge at one side of the apparatus 100 for fingerprint recognition and authentication. However, wherever it is formed, this does not go against the scope of the present invention.

The apparatus 100 for fingerprint recognition and authentication according to an embodiment may be digital equipment which performs a predetermined data processing to perform an operation desired by a user. The apparatus 100 for fingerprint recognition and authentication may include an input unit and a display unit DP, and may provide to a user a condition for the operation made by a predetermined operation command of a user through the input unit. FIG. 3 illustrates that the display unit DP of the apparatus 100 for fingerprint recognition and authentication is implemented by a touchscreen method, and accordingly, it plays a role of the input unit by itself. However, the input unit, for example, may be implemented by a keyboard or keypad method, and thus this may be additionally included in addition to the display unit DP.

The apparatus 100 for fingerprint recognition and authentication according to an embodiment should be understood as a term embracing digital equipment with operation ability, which includes a memory means and a microprocessor, such as a tablet PC, smart phone, personal computer, workstation, PDA, web pad, mobile phone, navigation, etc.

The fingerprint sensor 111 according to an embodiment may be implemented as a bar-shape. The bar-shaped fingerprint sensor 111 performs fingerprint recognition by sensing a fingerprint of a moving finger with a sliding method to read short fingerprint images, and matching these short fingerprint images into one image to implement a complete fingerprint image.

Hereinafter, the method for fingerprint recognition and authentication according to an embodiment of the present invention will be explained in detail.

FIG. 4 is a block diagram illustrating the detailed constitution of apparatus for fingerprint recognition and authentication according to an embodiment of the present invention.

Referring to FIG. 4, the apparatus 100 for fingerprint recognition and authentication may include a fingerprint recognition unit 110 and a fingerprint authentication unit 120.

The fingerprint recognition unit 110 is a unit which performs a function of recognizing a pattern for the fingerprint inputted, and may include a fingerprint sensor 111, a slice dividing unit 112, an information processing unit 113, and a template configuration unit 114.

The fingerprint authentication is a unit which compares the fingerprint recognized by the fingerprint recognition unit 110 with the pre-registered fingerprint to determine success or failure of authentication, and may include a template adjusting unit 121 and a matching unit 122.

The fingerprint recognition unit 110, fingerprint authentication unit 120 and their internal constitutional elements may be program modules operated in the apparatus 100 for fingerprint recognition and authentication. These program modules may be included in the apparatus 100 for fingerprint recognition and authentication in the shape of operation system, application program module and other program modules. Physically, the program modules may be stored in various well-known memory units. Meanwhile, according to the present invention, these program modules include a routine, subroutine, program, object, component, data structure, etc. which perform a specific task or perform a specific abstract data type that will be described later, but are not limited thereto.

Hereinafter, the method for fingerprint recognition according to an embodiment of the present invention will be explained with reference to FIGS. 4 and 5.

As illustrated in FIGS. 4 and 5, when the user touches his finger on the fingerprint sensor 111 and moves the finger with a sliding method, partial short fingerprint images P1~P4 are acquired continuously. Hereinafter, each short fingerprint image P1~P4 is referred to as a slice image. The slice images P1~P4 may be unit images forming a matched fingerprint image template. As the fingerprint slides as it is on a surface of the fingerprint sensor 111, the fingerprint pattern may be acquired as slice images P1~P4 as it is. That is, each of the slice images P1~P4 may include a pattern for a part of the fingerprint, for example, a pattern of a curve (a ridge) forming the fingerprint as it is.

According to the embodiments of the present invention, each slice image P1~P4 is divided into block images SP by the slice dividing unit 112. That is, one slice image P1~P4 is divided into a plurality of block images SP. The block image SP may be formed with a specific size and capacity. For example, one block image SP may have a size of 48 pixels and capacity of 64 bits, but the block image is not limited thereto.

In the past, the fingerprint recognition was performed based on minutiae forming the fingerprint. However, according to the embodiments of the present invention, the fingerprint pattern included in the block images SP is used as it is. Accordingly, the size of information used in the fingerprint recognition becomes larger. Thus, it is preferable to perform an information conversion process for the block images SP.

According to an embodiment, spatial domain information of each block image SP may be converted into frequency domain information by the information processing unit 113. As this conversion algorithm, for example, Discrete Cosine Transform (DCT) conversion method and Discrete Wavelet Transform (DWT) conversion method may be used.

After conversion, a process of leaving only information of low-frequency component is performed. With respect to fingerprint recognition, information of a low-frequency component with a small variable breadth between adjacent pixels is sufficient. Thus, in order to reduce information capacity, information of a high-frequency component is deleted. That is, the information processing unit 113 blocks information over a critical frequency in the frequency domain information using a low pass filter (LPF), and only leaves information which is not over the critical frequency. Additionally, information of a high-frequency component which is much affected by noise is filtered by the above-mentioned filtering process, thereby improving an entire signal-to-noise ratio.

Afterwards, a hashing process is selectively performed and thus a processing for the block image SP is completed.

The block images SP with capacity which becomes sufficiently small by the information processing unit 113 is matched into one image by the template configuration unit 114 to configure one fingerprint pattern template PT.

According to an embodiment of the present invention, the fingerprint pattern template is configured based on the fingerprint pattern itself, not by extracting only minutiae from the slice image acquired by the fingerprint sensor 111. Thus, accuracy of the fingerprint authentication may be improved through the comparison and analysis with the pre-stored fingerprint image.

Hereinafter, a process of adjusting the fingerprint pattern template PT and a process for fingerprint authentication will be explained with reference to FIGS. 4 and 6.

As stated above, the slice images acquired by the fingerprint sensor 111 are divided into the block images, and are matched again after going through a predetermined conversion and processing process to form one fingerprint pattern template PT.

During the fingerprint authentication process, the fingerprint pattern template PT acquired is compared with the pre-stored basic fingerprint pattern template. For fingerprint authentication, the user initially goes through a process for fingerprint registration, which allows the template acquired during the process for fingerprint registration to function as the basic fingerprint pattern template BPT. Afterwards, in the process for fingerprint authentication, the fingerprint pattern template PT acquired is compared with the basic fingerprint pattern template BPT. The process for fingerprint registration may be implemented by a process of storing the fingerprint pattern template created in the process for fingerprint recognition explained with reference to FIG. 5.

Even if the fingerprint patterns are the same, when the directions thereof are different, it is highly likely that those fingerprint patterns could be recognized as being different. For example, when registering the fingerprint, the finger slides while maintaining it at an angle of 90° with respect to a longitudinal direction of the bar-shaped fingerprint sensor 111. However, when the finger slides to another angle during the fingerprint authentication, the two fingerprints may be recognized as being different.

In order to solve this problem, the present invention goes through a process of adjusting the fingerprint pattern template PT acquired.

Specifically, the template adjusting unit 121 understands the ridge flow direction at the acquired fingerprint pattern template PT, and compares this with the ridge flow direction at the basic fingerprint pattern template BPT. When it is determined that the ridge flow directions are different as a result of comparison, the acquired fingerprint pattern template PT rotates at a certain angle to make it consistent with the pre-stored basic fingerprint pattern template BPT in terms of ridge flow direction. For example, as illustrated in FIG. 6, the ridge flow direction at a specific domain of the fingerprint pattern template PT is compared with the ridge flow direction of a domain corresponding to the specific domain at the basic fingerprint pattern template BPT to determine whether they are consistent with each other. If the two ridge flow directions are not consistent, the acquired fingerprint pattern template PT rotates as an angle inconsistent so that the ridge directions at the specific domain are consistent with each other.

The template adjusting unit 121 may determine that the directions are inconsistent when a difference in ridge flow direction is over a critical angle, and may perform an adjustment so that the difference in ridge direction at both fingerprint pattern templates may be narrowed to be below the critical angle.

According to the embodiments of the present invention, the fingerprint pattern template PT, which does not include minutiae of the fingerprint, but includes the fingerprint pattern as it is, is used, and the PT is adjusted to be consistent with the basic fingerprint pattern template BPT, which is the subject of comparison during the fingerprint authentication, in terms of ridge direction, thereby improving accuracy in the fingerprint authentication.

The matching unit 122 compares the fingerprint pattern template PT whose direction is adjusted by the template adjusting unit 121 with the basic fingerprint pattern template BPT to perform authentication for the recognized fingerprint. Through the comparison of fingerprint patterns at both templates, the degree of consistency can be determined. For example, when a rate of consistency is over a threshold, the matching unit 122 could determine that the fingerprint authentication is successful.

Although the exemplary embodiments of the present disclosure have been disclosed for illustrative purposes, those skilled in the art will appreciate that various modifications, additions and substitutions are possible, without departing from the scope and spirit of the present disclosure as disclosed in the accompanying claims. Therefore, it should be understood that the forgoing description is by way of example only, and is not intended to limit the present disclosure. For example, each constituent explained in singular form may be carried out being dispersed, and likewise, constituents explained as being dispersed may be carried out in combined forms.

The scope of the present disclosure is defined by the foregoing claims, and it is intended that the present disclosure covers the modifications or variations of the present disclosure provided they come within the scope of the appended claims and their equivalents.

The invention claimed is:

1. A method for fingerprint recognition and authentication, comprising:
   dividing a fingerprint image acquired by a fingerprint sensor into a plurality of block images, each of the block images including a part of a fingerprint pattern and the fingerprint pattern being formed by a ridge of a fingerprint;
   converting spatial domain information of each of the block images into frequency domain information, and eliminating information of a high-frequency component by using a low-pass filter; and
   forming a fingerprint pattern template by matching the block images, from which the information of the high-frequency component has been eliminated.

2. The method according to claim 1, further comprising:
   matching a first ridge flow direction at the fingerprint pattern template with a second ridge flow direction at a pre-registered basic fingerprint pattern template; and
   comparing the fingerprint pattern template with the pre-registered basic fingerprint pattern template to perform authentication.

3. The method of claim 2, wherein matching the ridge flow directions further comprising:
   rotating the fingerprint pattern template by an angle unmatched when the ridge flow directions are not matching at corresponding points between the fingerprint pattern template and the pre-registered basic fingerprint pattern template.

4. The method of claim 1, further comprising:
   performing a hashing for the block images from which the information of the high-frequency component has been eliminated.

5. An apparatus for fingerprint recognition and authentication, comprising:
   a dividing unit dividing a fingerprint image acquired by a fingerprint sensor into a plurality of block images, each of the block images including a part of a fingerprint pattern and the fingerprint pattern being formed by a ridge of a fingerprint;
   an information processing unit converting spatial domain information of the block images into frequency domain information, and eliminating information of a high-frequency component by using a low-pass filter; and
   a template configuration unit forming a fingerprint pattern template by matching the block images, from which the information of the high-frequency component has been eliminated.

6. The apparatus of claim 5, further comprising:
   a template adjusting unit matching a ridge flow direction at the fingerprint pattern template with a second ridge flow direction at a pre-registered basic fingerprint pattern template; and
   a matching unit comparing the fingerprint pattern template with the pre-registered basic fingerprint pattern template to perform authentication.

7. The apparatus of claim 6, wherein the template adjusting unit rotates the fingerprint pattern template by an angle unmatched when the ridge flow directions are not matching at corresponding points between the fingerprint pattern template and the pre-registered basic fingerprint pattern template.

8. The apparatus of claim 5, wherein the information processing unit further performs a hashing for the block images, from which the information of the high-frequency component has been eliminated.

* * * * *